United States Patent [19]
Lonn

[11] Patent Number: 6,140,649
[45] Date of Patent: Oct. 31, 2000

[54] IMAGING ATTENUATION CORRECTION EMPLOYING SIMULTANEOUS TRANSMISSION/EMISSION SCANNING

[75] Inventor: Albert Henry Roger Lonn, Beaconsfield, United Kingdom

[73] Assignee: General Electric Company, Milwaukee, Wis.

[21] Appl. No.: 08/996,611

[22] Filed: Dec. 23, 1997

[51] Int. Cl.[7] .................................................. G01T 1/161
[52] U.S. Cl. .............................. 250/363.04; 250/363.02
[58] Field of Search ........................... 250/363.04, 363.02

[56] References Cited

U.S. PATENT DOCUMENTS 5,608,221  3/1997  Bertelsen et al. ................... 250/363.04

*Primary Examiner*—Constantine Hannaher
*Assistant Examiner*—Andrew Israel
*Attorney, Agent, or Firm*—George E. Haas; Christian G. Cabou; Phyllis Y. Price

[57] ABSTRACT

A nuclear medical imaging system generates transmission and emission images simultaneously. The system includes a gamma camera and a linear transmission source disposed on opposite sides of an imaging region in which a patient lies. A plurality of views are taken at different rotational angles around a patient. At each angle, the view acquisition period is divided into two segments based on whether the transmission source is on or off. Emission image data is acquired either in both period segments or only while the transmission source is off. The transmission image data is acquired when the transmission source is on, and crosstalk image data is acquired when the transmission source is off.

10 Claims, 2 Drawing Sheets

IMAGING ATTENUATION CORRECTION EMPLOYING SIMULTANEOUS TRANSMISSION/EMISSION SCANNING

BACKGROUND OF THE INVENTION

The present invention relates to medical imaging cameras, and more specifically to imaging systems which include a mechanism for determining emission attenuation to compensate emission images for varying patient densities.

Single photon emission computed tomography (SPECT) examinations are carried out by injecting a compound labeled with a radiopharmaceutical tracer (isotope) into the body of a patient to be examined. The radiopharmaceutical is a substance that emits photons of gamma radiation at one or more specific energy levels, e.g. 140 keV. By choosing a compound that will accumulate in an organ to be imaged, the compound concentration, and hence radiopharmaceutical concentration, can be substantially limited to that organ of interest. Thus measuring the intensity of the gamma rays emitted from the patient, enables identification of organ characteristics and irregularities.

A planar gamma camera is used to measure the intensity of the photon emission. That camera comprises a stand that supports a detector which includes a collimator, scintillation crystal and a two dimensional array of photomultiplier tubes (PMTs) adjacent to the patient. The collimator is formed by a closely packed array of holes in a lead block, which define preferred photon paths. For example the Optima Low energy, high resolution collimator has over 30,000 holes with each one about 32 mm long and 1.8 mm across with 0.2 mm of lead between the adjacent holes. The collimator preferably allows gamma rays, which pass along the holes, to impinge on a scintillator and attenuates gamma rays which cross the lead septa. The scintillation crystal abuts the collimator on a side opposite the patient to absorb photons and emit light each time a photon is absorbed. The intensity of the light corresponds to the energy level of the photon which causes the light emission. The PMTs detect the light emitted by the scintillation crystal and respond by generating analog electrical intensity signals corresponding to the energy level of each photon.

A processor receives the PMT signals and digitally processes those having energy levels that are associated with photons emitted by the radiopharmaceutical tracer. The processor digitally stores emission information as a two dimensional array of pixels. The processor uses the pixel information to form an emission projection image, known as a view, at the particular camera position.

Most gamma camera systems generate a plurality of emission views, each taken by positioning the gamma camera parallel to and at a different angle about a rotation axis passing through the patient. The angle is incremented between views so that the plurality of projection images can be acquired and used together to construct pictures of transaxial slices of the body using algorithms and iterative methods that are well known to those skilled in the tomographic arts.

Unfortunately, because different materials are characterized by different attenuation coefficients, photons are attenuated to varying degrees as they pass through various portions of a patient's body. For example, a given thickness of bone typically attenuates a greater percentage of photons than the same thickness of tissue. The organ image is degraded when the different anatomical features attenuate the radiation leaving the body, in effect casting shadows on the projection image. When the projection images taken at many different view angles are used to reconstruct a tomographic picture, these shadows create artifacts in the reconstructed picture.

To compensate for such artifacts, a transmission measurement may be made by placing a calibrated radiation source on the opposite side of the patient from the gamma camera and measuring the amount of radiation that passes through the patient. This provides a measurement of how much of the known radiation is attenuated. The transmission radiation source emits gamma rays at an energy level (e.g. 100 keV), distinguishable from the radiopharmaceutical energy level (e.g. 140 keV), thus allowing the gamma camera to separately measure the emission received from each source. However, when imaging a patient using a radiopharmaceutical tracer that has a higher energy than-the transmission source, scattered photons from the tracer can be reduced in energy and mistaken for transmission photons. This "crosstalk" contaminates the transmission image.

A previous approach that reduced the crosstalk effects involved "masking"—electronically defining an acceptance window in the camera's field of view. Radiological events outside the acceptance window were masked, or rejected, from further processing. The acceptance window moves across the field of view in correspondence with a scanning transmission source so that the window instantaneously exposes the area on the cameras detector where transmission events are expected to occur and an electronic mask covers other detector areas. Although this masking reduces the crosstalk, it does not eliminate the need for some crosstalk correction.

The simplest way to acquire the needed crosstalk data is to first perform a complete tomographic acquisition rotation during which only emission data (i.e. photons at energy levels from the radiopharmaceutical tracer) are accepted. During this time an image also can be acquired using the transmission energy levels, but with the transmission gamma source inactive. This latter image provides a measurement of the activity that scatters from the tracer and appears in the transmission energy range which then is used to correct crosstalk in the transmission image. A second acquisition rotation is performed during which the transmission source is swept across the detector field of view at each view angle. The transmission events within the transmission energy range and within the mask acceptance range are detected. While this technique provides a simple process for eliminating crosstalk, it requires two rotations of the detector assembly and prolongs the patient's stay in the imaging system. In addition, the method is susceptible to errors resulting from movement of the patient between the two acquisitions.

SUMMARY OF THE INVENTION

A typical medical imaging system, with which the present invention can be used, produces an image from emission of photons at a first energy level from a radiopharmaceutical tracer injected into the patient. The imaging system has a camera with a two dimensional array of radiation detectors. Also included is a linear transmission radiation source which moves across radiation detectors while emitting photons at a second energy level. An event occurs when a given photon strikes one of the radiation detectors.

The present invention provides a method in which all of the image data is acquired during a single rotational scan of the patient. In particular, the camera acquires transmission and emission data simultaneously during each view and the crosstalk data is acquired during a segment of the view when the transmission source is inactive.

The present method comprises inhibiting photon emission from the transmission radiation source for a first period of time and activating the transmission radiation source to emit photons during a second period of time. A given event is categorized as a crosstalk event when it occurs during the first period of time and the associated photon has an energy level in a first range that includes the second energy level. When the given event occurs during the first period of time and the associated photon has an energy level in a second range that includes the second energy level, the given event is categorized as a transmission event. An emission event is categorized when the associated photon has an energy level in a third range that includes the first energy level.

Information about emission events, crosstalk events and transmission events are stored in a separate memory area for each type of event. A corrected transmission image is produced by combining information about transmission events and crosstalk events. Then the corrected transmission image is employed to compensate the emission event data and produce an image of the patient.

DETAILED DESCRIPTION OF THE INVENTION

A. Hardware Configuration

Figure 1:
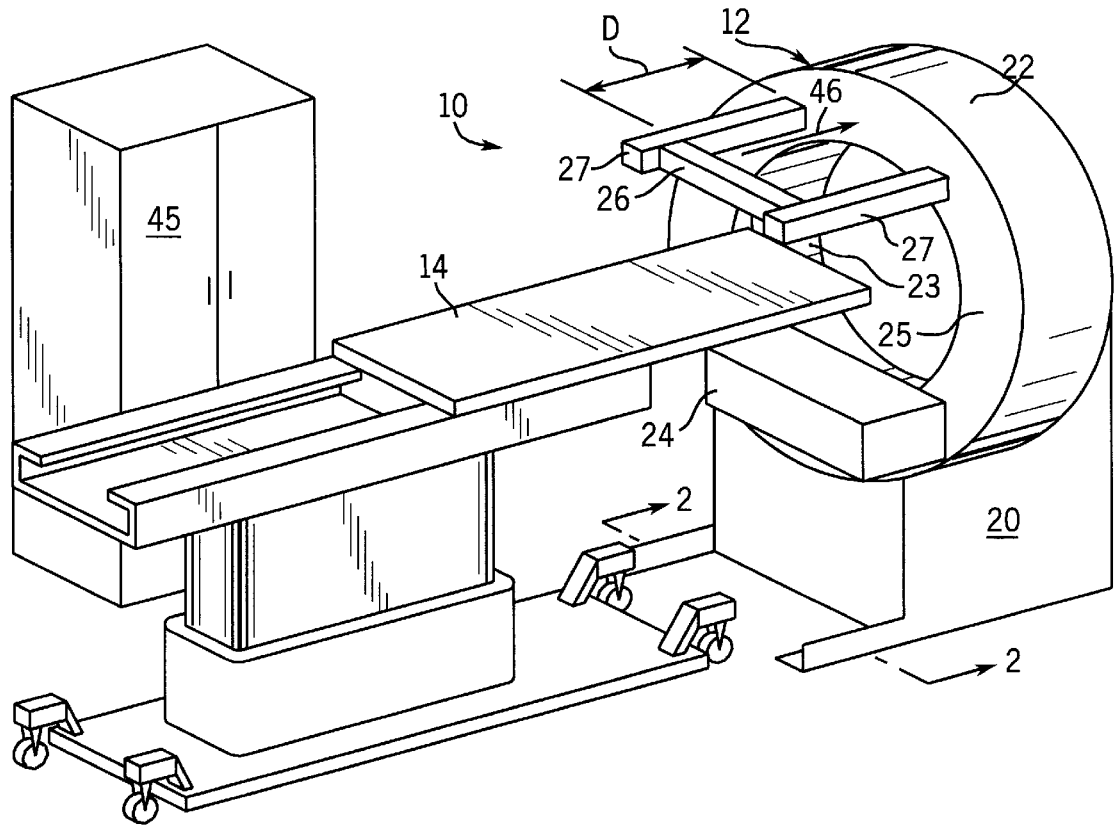
FIG. 1 is an isometric view of an imaging system employing the present invention.
Figure 2:
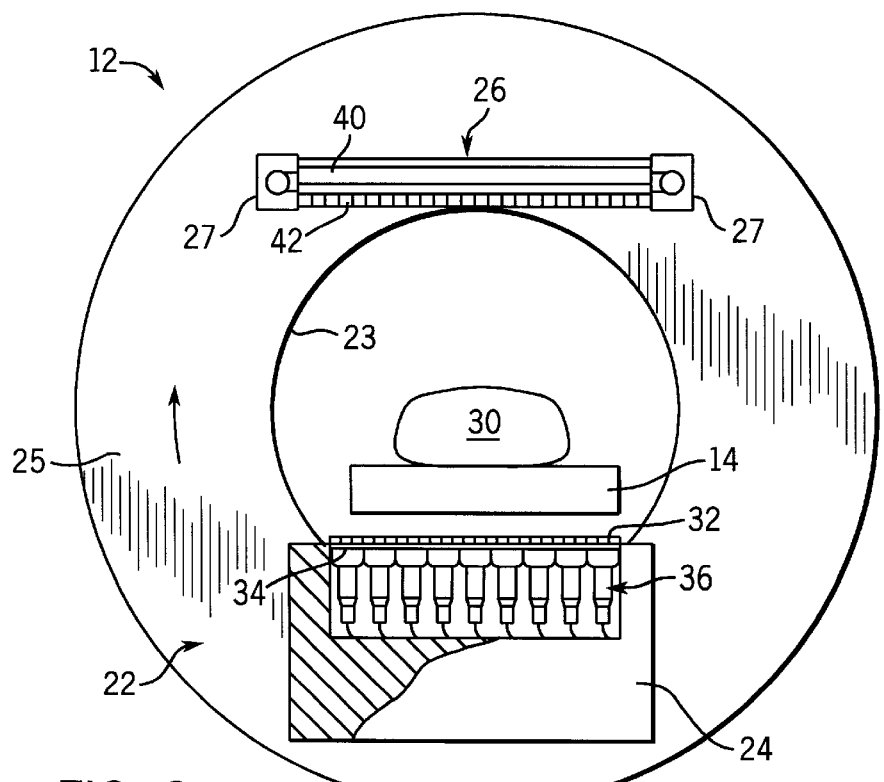
FIG. 2 is a cross sectional view taken along the line 2—2 of FIG. 1.

With initial reference to FIGS. 1 and 2, an imaging system 10 includes a tomographic assembly 12 and a patient support table 14 which is transparent to gamma radiation. The support table 14 includes platform 16 for supporting a patient in a manner that enables the patient to be moved into and out of the field of view of the tomographic assembly 12.

The tomographic assembly 12 includes a pedestal 20 with a gantry 22 mounted thereon. The gantry 22 is annular shaped with a central opening 23 for receiving an end of the table 14 and the patient lying thereon. A planar gamma camera 24 and a linear transmission radiation source 26 are supported on the front surface 25 of the gantry 22 in a manner that allows those components to rotate about the end of the table 14 to acquire a series of projection images of the patient at different angular positions. The pedestal 20 houses a motor for rotating the gantry 22 through 180° of rotation. Alternatively, the present invention can be used with imaging systems that have multiple cameras and which rotate the gantry through smaller angles. In that case, the present method would be applied individually to the operation of each camera.

Referring to FIG. 2, the gamma camera 24 detects and identifies coordinates of gamma emissions from the patient 30. The camera 24 includes a lead plate 32 with a myriad of fine holes perpendicular to its surface that faces the patient thereby acting as a collimator defining parallel radiation paths therethrough. A scintillation crystal 34 is positioned behind the collimator plate 32 to absorb gamma emissions passing through the holes. The scintillation crystal 34 produces light with an intensity that corresponds to the level of gamma radiation impingement. The emitted light is directed toward an array of closely packed photomultiplier tubes (PMTs) which are collectively designated by numeral 36. The array is organized in rows and columns of photomultiplier tubes with each tube having a unique location, or address, designated by row and column numbers.

Detected light emissions cause the PMTs 36 to produce analog electrical signals which are sent to a processor 45 (FIG. 1) that uses the signals to compute two dimensional coordinates of each gamma emission absorbed in terms of analog signal magnitudes. Conventional hardware and techniques are employed to compute these coordinates in terms of the analog photomultiplier signals. One scheme for determining the coordinates of each gamma emission is described in U.S. Pat. No. 4,142,102 which is incorporated herein by reference. The two dimensional coordinates computed from the array of photomultipliers allow the events to be located within a few millimeters, even though the PMT array consists of photomultipliers which typically are up to 60 mm apart. The computed coordinates are used to address an array of discrete memory elements, referred to as pixels, representing a regular array of addresses spaced by some small distance (e.g. 3 mm) apart in each dimension. There may be a plurality of similar arrays to be accessed depending on the energy of the event. When an event of a particular energy is detected, the computed address is used to access the corresponding memory element, or pixel, and the value of the pixel is incremented by one count. Thus over a period of time, the array of memory elements accumulates an image of events which are detected by the detector.

With reference to FIGS. 1 and 2, the transmission radiation source 26 extends between a pair of tracks 27 that project perpendicularly from the front surface 25 of the gantry 22. The transmission source 26 includes an elongated generator 40 of gamma radiation and a collimator 42 which allows gamma transmissions to exit the source only in a direction that is toward the gamma camera 24 perpendicular to the length of the generator. The generator 40 is designed to emit a line of gamma particles at an energy level that is appreciably different than the energy level of the photon emissions produced by the radiopharmaceutical injected into the patient 30.

The transmission radiation source 26 is slidably mounted at its ends for movement along the tracks 27 on the side of the patient that is opposite the gamma camera 24. The source 26 is centered with respect to the central opening 23 of the gantry 22 and substantially traverses the face of the gamma camera 24. A driver or motor (not shown) moves the transmission radiation source 26 a distance D along the tracks 27 in a controlled manner.

B. Operation

In order to acquire an image, a radiopharmaceutical tracer is injected into a patient's blood stream. After waiting for the radiopharmaceutical to become concentrated in the organ to be imaged, the patient reclines on the table 14 which is manipulated until the organ is positioned within the gantry opening 23. Once the patient is properly positioned, image acquisition may commence. The image acquisition is divided into a plurality of views, or projections, each being acquired at a different angle about the patient 30.

At each view, both radiopharmaceutical emission data and transmission data from source 26 are acquired separately. That data is produced by "events", each one occurring when a photon is detected by one of the photomultiplier tubes in array 36. In response, the photomultiplier tube produces an electrical signal which is sent to the processing circuitry 45 of imaging system 10. The magnitude of the electrical signal indicates the energy level of the associated photon and location of the photomultiplier tube in the array indicates the relative position of the photon source in the patient.

Several sets of emission data (ES1, ES2, ES3, ES4) are acquired by selecting those events produced by photons having separate predefined energies. Emission sets ES1 and ES2 represent events produced by the radiopharmaceutical tracer photons. For example, Thallium emits photons at two useful energy levels, 167 keV and 72 keV, and emission set ES1 collects data related to events resulting from photons having energy in the 157–177 keV range, while emission set ES2 gathers data related to events produced by photons in the 62–82 keV energy range. If the radiopharmaceutical tracer, such as Technetium, emits photons at only one useful energy level, then emission set ES2 would not be processed. Emission set ES3 gathers data related to events produced by photons from the linear transmission source 26 and crosstalk events produced by emission photons that lose energy, thus contaminating the transmission data. The ES3 data relates to events produced by photons in the 90–110 keV range which includes the 100 Kev energy level of the transmission source 26. Emission set ES4 is a compilation of event data associated with transmission photon scattering which contaminates the emission data in the ES1 and ES2 sets.

Figures 3, 4:
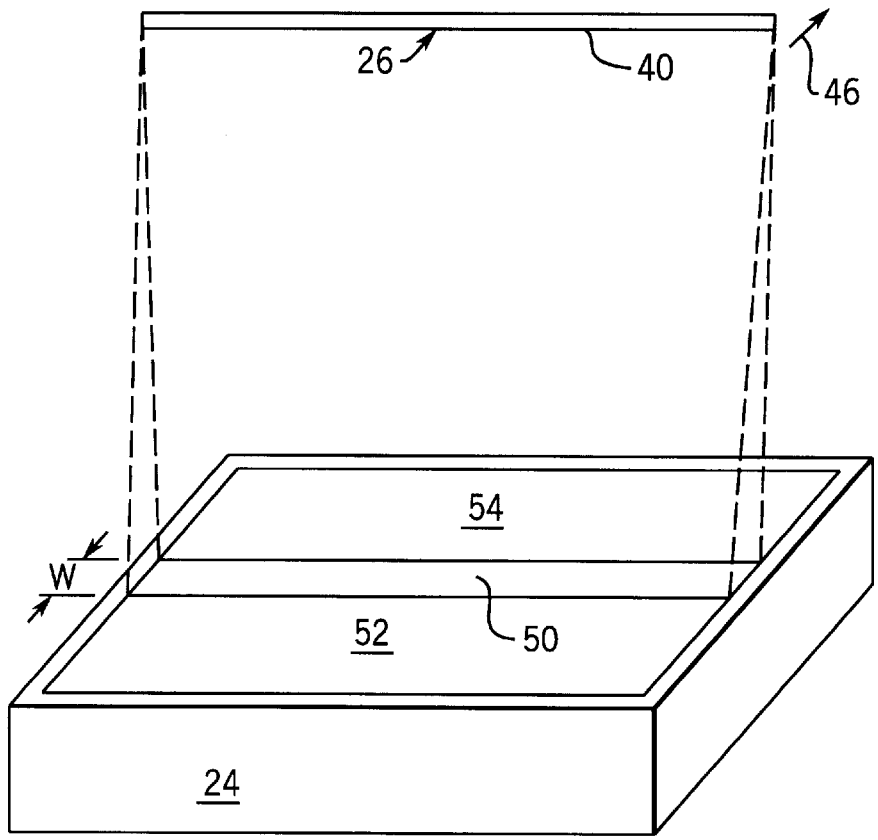
FIG. 3 schematically depicts electronic masking of the radiation detector in the imaging system.
FIG. 4 depicts different image processing segments which occur during each view of the patient.

At each imaging angle, the view acquisition time is divided into two segments during which the transmission source 26 is turned off and on, respectively, as depicted in FIG. 4. For example, the transmission source 26 is turned off for the initial twenty seconds and then turned on for the remaining five seconds of the 25 second duration view. Thus eight image sets are produced during each view, two images sets for each emission set ES1–ES4 depending upon whether the transmission source is on or off. As will be described in further detail, the emission set ES1 produces Emission Data 1 and Emission Data 2, while the emission set ES2 produces Emission Data 3 and Emission Data 4 which are stored as four separate image sets. Emission set ES3 generates crosstalk data and transmission data images depending upon whether the transmission source 26 is off or on, respectively. Similarly, the ES4 emission set produces two image sets of scatter data.

Each image set is stored in a separate two dimensional array in the memory of the processor 45 which tabulates the occurrences of the different event categories. Each memory matrix has separate storage locations (or pixels) which correspond to the image addresses computed from the array of photomultiplier events. As the processor 45 categorizes an event based on its energy level, a spatial histogram is created within the associated memory matrix which counts a number of that category of event which occur at each image element.

As each event occurs, the processing circuitry 45 determines whether the magnitude of the signal indicates that the photon falls within an energy ranges associated with one of the emission sets ES1–ES4. The processing circuitry 45 also determines the likely location of the event in the scintillator by combining all the PMT signals which occur within a certain short time period. This computed location is used to increment the corresponding image pixel in the appropriate energy range.

At the beginning of each view, the transmission source 26 initially is positioned at one end of the track 38 and turned off. Without any transmission photons produced, the photons selected for emission set ES3 represent only those emission photons from the radiopharmaceutical tracer which have decreased in energy to a level which would contaminate the transmission data.

At some point during the view acquisition time, e.g. 20 seconds into the view, the transmission source 26 is turned on to emits 100 keV photons that pass through the patient 30.

The active transmission source 26 moves along the entire length of the tracks 27 in the direction indicated by arrow 46 in FIGS. 1 and 3. Therefore during this temporal segment of the view, the gamma camera 24 is receiving 100 keV photons from the linear transmission source, as well as 72 keV and 167 keV photons from the radiopharmaceutical tracer.

In this later segment, the present imaging system 10 utilizes an electronic mask to categorize the photons based the locations of impingement upon the photomultiplier array in gamma camera 24. With reference to FIG. 3, the signal processor 45 electronically divides the two dimensional array of photomultiplier tubes 36 into several regions. The first is a slot-like acceptance region which is parallel to the transmission source 26 and has a constant width W, thus creating a region where the transmission source photons are collimated onto the gamma cameras 24. This acceptance region 50 corresponds to an area on the image plane of the gamma camera 24 in which photons from the transmission source 26 are expected to be detected. The acceptance region 50 is moved electronically across the photomultiplier tube array 36 in coincidence with the movement of the transmission source 26.

Mask regions 52 and 54 are defined electronically on opposite sides of the rectangular acceptance region 50 in the image array. These mask regions correspond to areas of the array at which photons from the transmission source 26 normally should not be detected.

The acceptance region 50 has a constant shape and size as it is electronically scanned across the camera, row-by-row in synchronism with the physical movement of the transmission source 26. As this occurs, the relative size of the two mask regions 52 and 54 changes. At the beginning of the scan, there is no mask region 52 when the transmission source 26 is at the beginning end of its travel and the other boundary region 54 is at a maximum size extending across the majority of the face of the camera. During the imaging period as the transmission source 46 moves across the patient, the first mask region 52 enlarges in size while the second mask region 54 decreases in size. The electronic scanning of the various regions is performed by maintaining tables of row addresses of the pixels in the image array. A separate table contains the range of row addresses for each region and the row addresses for each range are incremented to scan the associated region across the gamma camera. Thus when an event is detected, its row address is compared to the address tables to determine the region in which it occurs.

During the view segment when the transmission source 26 is active, the mask and acceptance regions are employed, along with the photon energy, to categorize each event from the gamma camera 24 as an emission event, a transmission event or a scatter event. The Emission Data 2 image set does not utilize a mask as its energy level range is above that of the transmission source and thus cannot be corrupted. However the mask is used with respect to the Emission Data 4 image set formed by photon events in the 62–92 keV range which is below the energy of the transmission source photons. Therefore an Emission Data 4 is defined as an event caused by a photon having an energy level that is within that range and which occurs within one of the mask regions 52 or 54. "Transmission events" are those events which have an energy level that falls within the Emission set ES3 range (110–130 keV) associated with photons emitted by the transmission source 26 and which occur at an image location that is within the acceptance region 50 of the camera 24.

At the culmination of the view acquisition period, the eight memory matrices contain the data related to one projection view of the patient. These data sets are combined in a predefined manner to produce the image for that view of the patient.

A corrected emission image is produced by combining the two dimensional data from the arrays of Emission Data 1, emission data 2 and Emission Data 3. In typical processing, Emission Data 4 is discarded due to corruption by scattered transmission source photons.

A corrected transmission image results from subtracting a compensated version of the crosstalk data from the transmission data. The crosstalk compensation adjusts for the difference in acquisition times of the two segments of emission set ES3 and for the time that the acquisition region "opened" a given image location to photon bombardment to create the transmission data. The crosstalk data also is filtered to smooth effects of noise.

For example, a corrected transmission image (CTI) can be produced utilizing the following formulas:

$$C_m = \frac{\text{Acceptance Region Width}}{\text{Line Source Travel Distance}}$$

$$C_t = \frac{\text{Transmission Scan Time}}{\text{Emission Scan Time}}$$

$$CTI = \text{Transmission Image} - \text{Crosstalk Image} \times C_t \times C_m$$

After the transmission data has been corrected and stored, the image processor 45 forms initial emission images and corresponding initial transmission images using iterative algorithms that are well-known in the art. After initial images have been developed, the initial transmission images can be used to generate an attenuation map indicating non-uniform attenuation. Next, the processor can use both the initial emission images and the attenuation map to compensate the initial emission images for non-uniform attenuation throughout the imaged portion of the patient's body to generate corrected emission images. Methods and apparatus for combining emission images and attenuation maps are well known in the art and therefore will not be explained in detail here. Any method for combining emission and attenuation data may be used, such as the method described in U.S. Pat. No. 5,337,213 which is incorporated herein by reference. Then, the corrected emission images can be combined by a computer to provide accurate tomographic images of the imaged organ.

I claim:

1. A method of acquiring view data of a patient produced by a medical imaging system from emission of photons at a first energy level emitted by a radiopharmaceutical tracer, the medical imaging system including a camera which has a two dimensional array of radiation detectors and which includes a transmission radiation source that emits photons at a second energy level, wherein an event occurs when a given photon strikes one of the radiation detectors; the method comprises steps of:

inhibiting photon emission from the transmission radiation source for a first period of time;

activating the transmission radiation source to emit photons during a second period of time;

categorizing an event, which occurs during the first period of time, as a crosstalk event when the given photon has an energy level in a first range which is a function of the second energy level;

categorizing an event, which occurs during the second period of time, as a transmission event when the given photon has an energy level in a second range which is a function of the second energy level;

categorizing an event as an emission event when the given photon has an energy level in a third range which is a function of the first energy level;

storing information about each emission event, crosstalk event and transmission event in a separate memory area for each type of event; and producing a corrected transmission image by combining information about transmission events and crosstalk events.

2. The method as recited in claim 1 wherein producing the corrected transmission image comprises subtracting information about crosstalk events from information about transmission events.

3. The method as recited in claim 1 further comprising adjusting the information about crosstalk events to compensate for differences in lengths of the first and second periods to produce adjusted crosstalk information; and thereafter producing the corrected transmission image by subtracting the adjusted crosstalk information from information about transmission events.

4. The method as recited in claim 1 further comprising designating a portion of the two dimensional array of radiation detectors as an acceptance region of the camera; and wherein an event also must occur within the acceptance region in order to be categorized as a transmission event.

5. The method as recited in claim 1 wherein an event must also occur only during the first period in order to be categorized as an emission event.

6. The method as recited in claim 1 wherein the radiopharmaceutical tracer also emits photons at a third energy level, and the method further comprises:

categorizing an event, which occurs during the first period of time, as an ancillary emission event when the given photon has an energy level in a fourth range that includes the third energy level; and storing information about ancillary emission events.

7. The method as recited in claim 1 further comprising:

categorizing an event as a scatter event when the given photon has an energy level in a fourth range that includes at least a portion of the third range; and storing information about scatter events.

8. A method of acquiring view data of a patient produced by a medical imaging system from emission of photons at a first energy level emitted by a radiopharmaceutical tracer, the medical imaging system including a camera which has a two dimensional array of radiation detectors and which includes a transmission radiation source that moves with respect to the two dimensional array of radiation detectors while emitting photons at a second energy level, wherein an event occurs when a given photon strikes one of the radiation detectors; the method comprises steps of:

inhibiting photon emission from the transmission radiation source for a first period of time;

activating the transmission radiation source to emit photons during a second period of time;

during the second period of time, designating a portion of the two dimensional array of radiation detectors as an acceptance region of the camera;

categorizing an event, which occurs during the first period of time, as a crosstalk event when the given photon has an energy level in a first range that includes the second energy level;

categorizing an event, which occurs in the acceptance region during the second period of time, as a transmission event when the given photon has an energy level in a second range that includes the second energy level;

categorizing an event as an emission event when the given photon has an energy level in a third range that includes the first energy level;

storing information about each emission event, crosstalk event and transmission event in a separate memory area for each type of event; and producing a corrected transmission image by combining information about transmission events and crosstalk events.

9. The method as recited in claim 8 wherein the radiopharmaceutical tracer also emits photons at a third energy level, and the method further comprises:

categorizing an event, which occurs during the first period of time, as an ancillary emission event when the given photon has an energy level in a fourth range that includes the third energy level; and storing information about ancillary emission events.

10. The method as recited in claim 8 further comprising redesignating the portion of the two dimensional array of radiation detectors so that the acceptance region changes as the transmission radiation source moves.

* * * * *